United States Patent [19]
Ryu et al.

[11] Patent Number: 6,091,815
[45] Date of Patent: Jul. 18, 2000

[54] FLIP COVER IN FLIP TYPE OF PORTABLE TELEPHONE APPARATUS

[75] Inventors: Gwan-Woo Ryu; Byung-Han Kim, both of Kyongsangbuk-do, Rep. of Korea

[73] Assignee: Samsung Electronics Co., Ltd., Rep. of Korea

[21] Appl. No.: 09/063,744

[22] Filed: Apr. 21, 1998

[30] Foreign Application Priority Data

May 13, 1997 [KR] Rep. of Korea ...................... 97-18411

[51] Int. Cl.⁷ ....................................................... H04M 1/00
[52] U.S. Cl. .............................................................. 379/433
[58] Field of Search ................................... 379/433, 428, 379/434; 455/575, 90

[56] References Cited

U.S. PATENT DOCUMENTS 5,260,998  11/1993  Takagi ..................................... 379/433

FOREIGN PATENT DOCUMENTS

| 0 588 210 A1 | 3/1994 | European Pat. Off. | ......... H04M 1/02 |
| 196 19 277 A1 | 11/1996 | Germany . | |
| 2 158 328A | 11/1985 | United Kingdom | ............. H04B 5/02 |
| 2 320 148A | 6/1998 | United Kingdom | ............. H04B 1/08 |
| WO 94/13088 | 6/1994 | WIPO | ............................. H04M 1/00 |

*Primary Examiner*—Jack Chiang
*Attorney, Agent, or Firm*—Dilworth & Barrese

[57] ABSTRACT

A flip cover of a portable telephone apparatus, in which a flip cover includes a two stage extension so as to prevent transmitted voice from being dispersed and to prevent any noise from occurring when transmitting and receiving speech (voice). The flip cover includes an upper flip, a lower flip fixed to an inner side of the upper flip, and an inner flip slidably mounted to the upper and lower flip. A guide rib formed in the upper flip and a slide groove formed in the lower flip facilitate the sliding motion. A fixing projection provided on an upper side of the lower flip and upper and lower fixing grooves on the inner flip are adapted to be fixably fitted into the fixing projection. A guide projection formed at both sides of the front end of the inner flip is adapted to be fitted into the slide groove of the lower flip and guided therein.

18 Claims, 17 Drawing Sheets

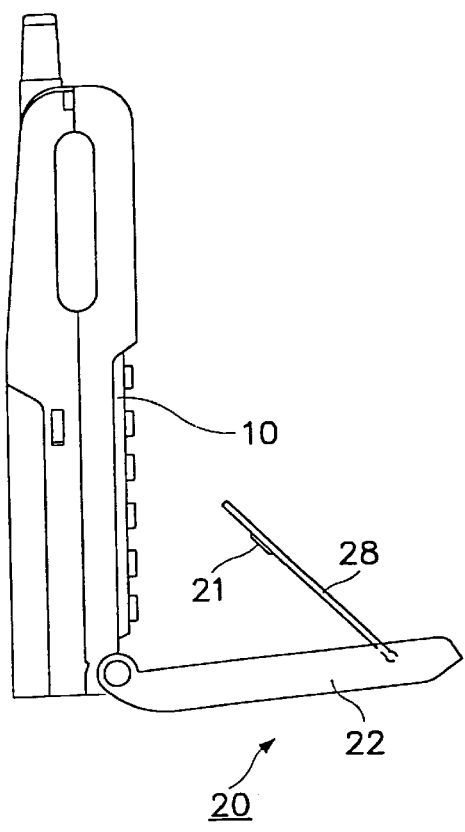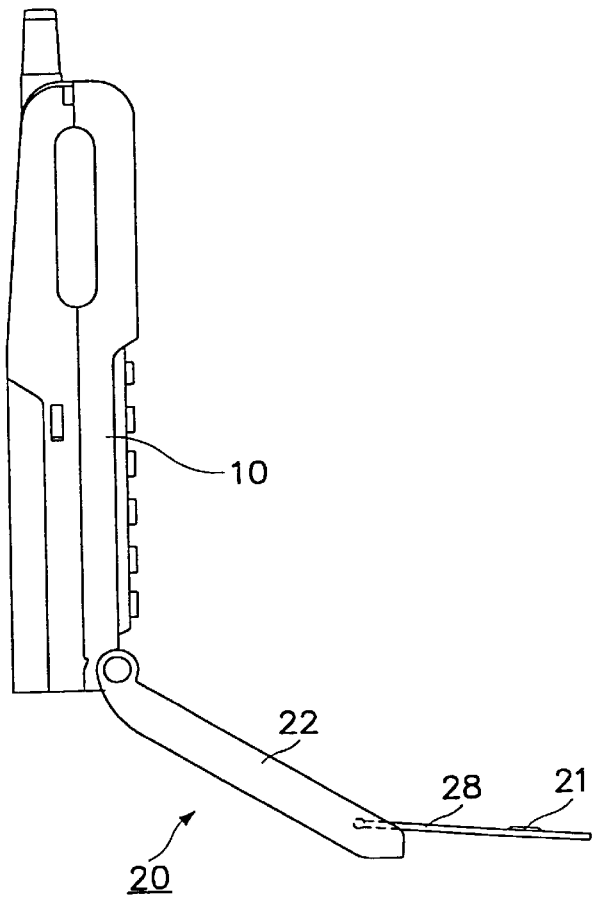
FIG. 17a
FIG. 17b

FLIP COVER IN FLIP TYPE OF PORTABLE TELEPHONE APPARATUS

BACKGROUND OF THE INVENTION

1. Field of the Invention

The present invention relates to a flip cover of a flip type portable telephone apparatus. More particularly, it relates to a flip cover for a portable radio telephone that can be extended in a two stage configuration to prevent the dispersal of transmitted speech/voice, and to prevent the occurrence of any noise.

2. Description of the Related Art

Generally, a portable telephone apparatus can include a cellular phone, a handset of a radio telephone, and a car phone. The cellular phone performs its telecommunication function while performing radio telecommunication with a base station. The radio telephone performs its telecommunication function while performing radio telecommunication between its portable telephone apparatus and its fixed terminal.

With the miniaturization of electronic and high frequency reception devices, the radio telephone is currently heading toward miniaturization. For this reason, a flip type radio telephone having good voice reception has been generally required. A flip cover mounted on the main body of the flip type radio telephone protects a plurality of buttons and reflects voice.

A conventional flip type radio telephone will be described with reference to FIGS. 1 to 3. As illustrated in FIG. 1 to FIG. 3, the conventional flip type radio telephone includes a switch (flip module, not shown) which connects a flip cover 20 with a main body 10. The flip type radio telephone is designed to be automatically converted into a speech mode depending on the position of the switch included with flip cover 20. A speaker 11 is connected to an upper portion of the main body 10, and microphone 21 is mounted in the hinge portion of the flip cover 20.

The flip cover 20 is opened and closed from the main body 10. Thus, the flip type of radio telephone can be used when the state of flip cover 20 is opened at a predetermined angle during telephone speech.

Although the flip type radio telephone is becoming more and more miniaturized, there is a limitation in the miniaturization of the radio telephone because the distance between the user's ear and mouth should be ensured within a predetermined interval.

In other words, the distance between the speech transmitting portion (microphone) and speech receiving portion (speaker) of a telephone should be maintained at 14 cm or more. Thus, the size of the radio telephone must be designed to satisfy this distance condition. The microphone of the conventional flip type of radio telephone is mounted in the flip cover to satisfy such a condition in order to achieve miniaturization.

However, the conventional flip type radio telephone has several problems. The flip type radio telephone fails to sufficiently cover the ear and mouth of the user because of the short length of the flip cover. In addition, the conventional flip type of radio telephone disperses transmitted voice and generates noise when transmitting and receiving voice signals. This type of flip type radio telephone fails to prevent these drawbacks.

SUMMARY OF THE INVENTION

It is therefore an object of the present invention to provide a flip cover for a portable radio telephone that can be extended in a two stage configuration so as to prevent the dispersal of transmitted voice and to prevent the occurrence of noise when transmitting and receiving speech/voice.

It is another object of the present invention to provide a flip cover for a portable radio telephone, which includes an inner flip slidably mounted in the flip cover and which slidably extends to provide a second stage to the flip cover so that the dispersal of transmitted voice and noise occurring during the transmitting and receiving of voice (speech) can be prevented.

It is another object of the present invention to provide a flip cover for a portable radio telephone, which includes an inner flip that is foldingly mounted within the flip cover and is extendable to provide a second stage to the flip cover.

To achieve the above and other objects, there is provided a flip cover in a flip type of a portable telephone apparatus, combined with a main body of the portable telephone apparatus, the flip cover having an upper flip provided for the flip cover, a lower flip being fixed to an inner side of the upper flip, and an inner flip combined with a guide rib and a slide groove for slidably extending outward from the upper and lower flip. The sliding motion of the inner flip is facilitated by the guide rib of the upper flip and the slide groove of the lower flip where the guide rib is formed in an inner wall of the upper flip, and the slide groove is formed at both sides of the lower flip. A fixing projection is provided on an upper side of the lower flip, upper and lower fixing grooves in the inner flip are fixably fitted into the fixing projection; and a guide projection formed at both sides of the front end of the inner flip are fitted into the slide groove of the lower flip and guided.

BRIEF DESCRIPTION OF THE DRAWINGS

The above and other objects, features and advantages of the present invention will become more apparent in the light of the following detailed description of an exemplary embodiment thereof taken with the attached drawings in which:

FIGS. 17a and 17b are side views illustrating the opening of a flip cover the flip type of portable telephone apparatus according to the second embodiment of the present invention;

DETAILED DESCRIPTION OF PREFERRED EMBODIMENTS

Figure 1:
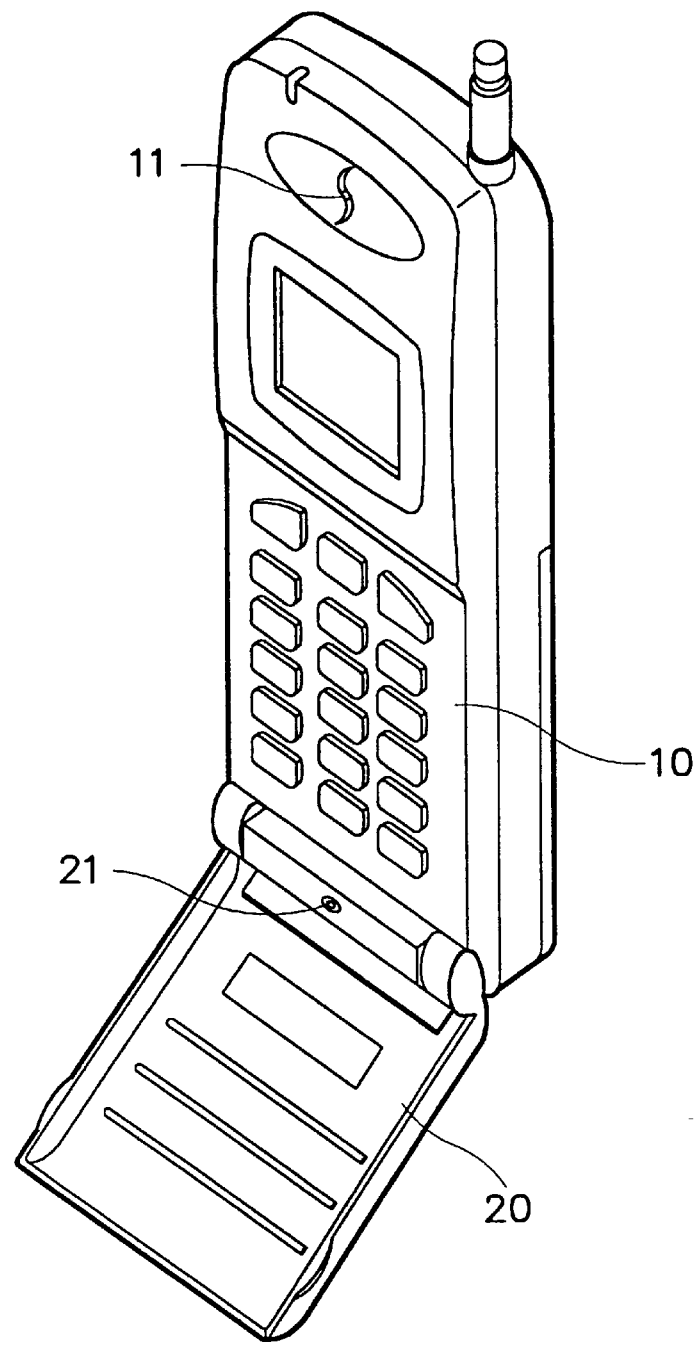
FIG. 1 is a perspective view of a conventional flip type portable telephone apparatus.
Figure 2:
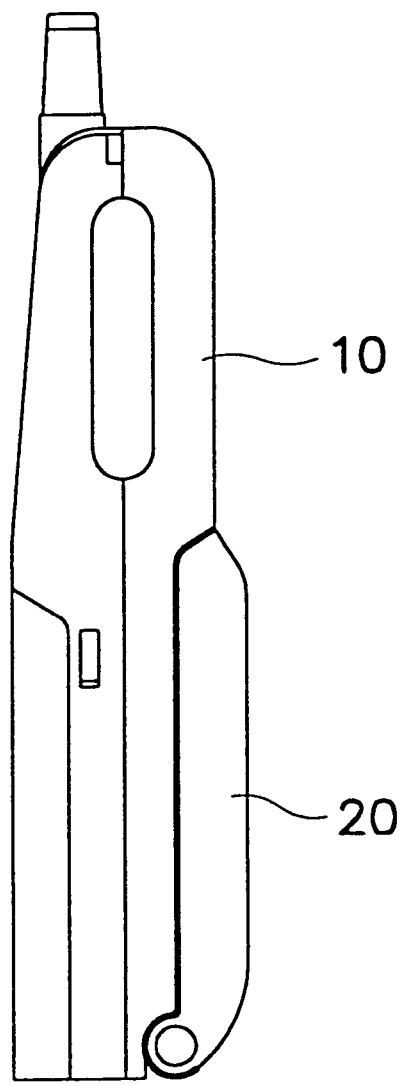
FIG. 2 is a side view of a conventional flip type portable telephone with the flip cover closed.
Figure 3:
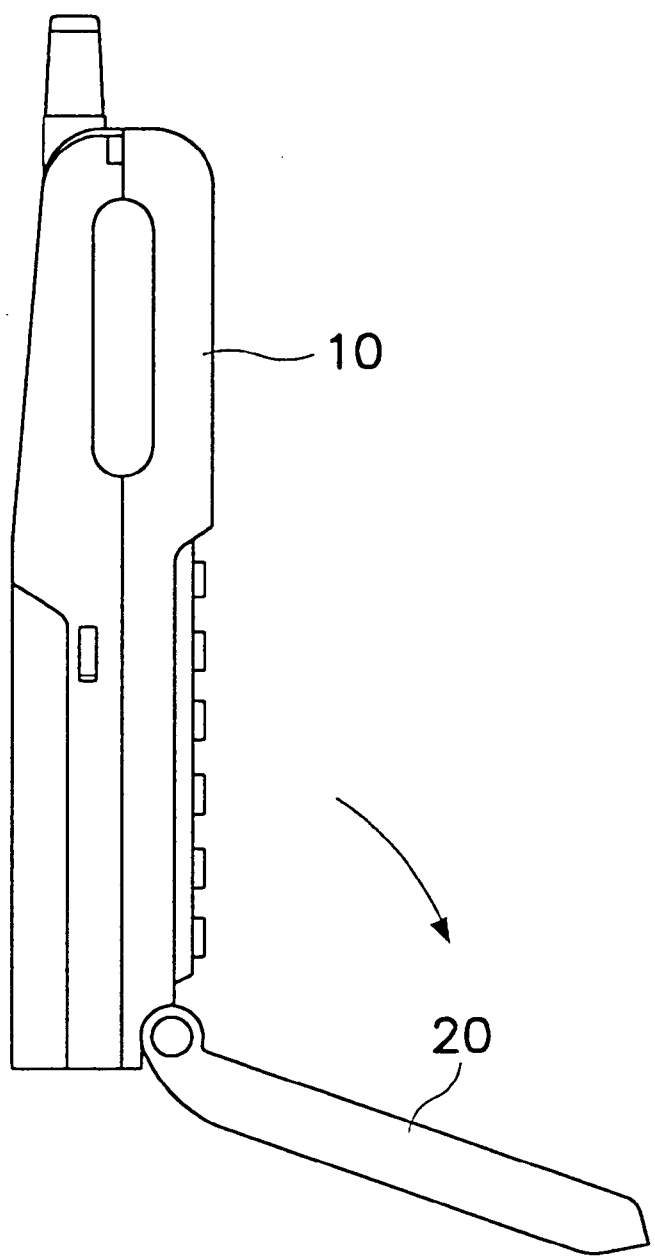
FIG. 3 is a side view of a conventional flip type portable telephone with the flip cover open.

Preferred embodiments of the present invention will be described in detail referring to the attached drawings, in which the like reference numerals denote the same elements in the drawings. In addition, an unnecessary detailed description of widely known functions and constructions may be avoided here.

Figure 4:
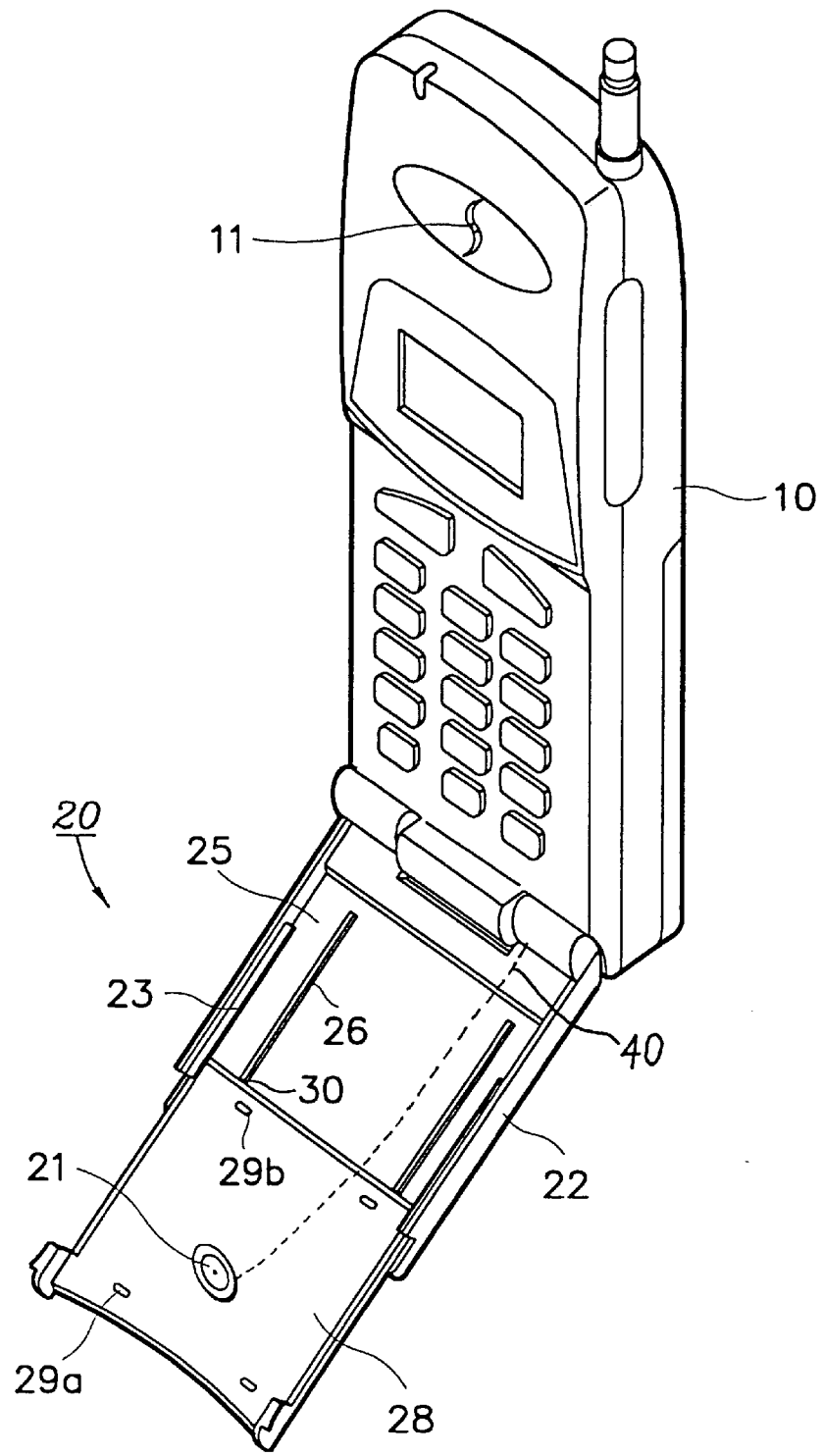
FIG. 4 is a perspective view of a flip type of portable telephone apparatus according to a first embodiment of the present invention.
Figure 5:
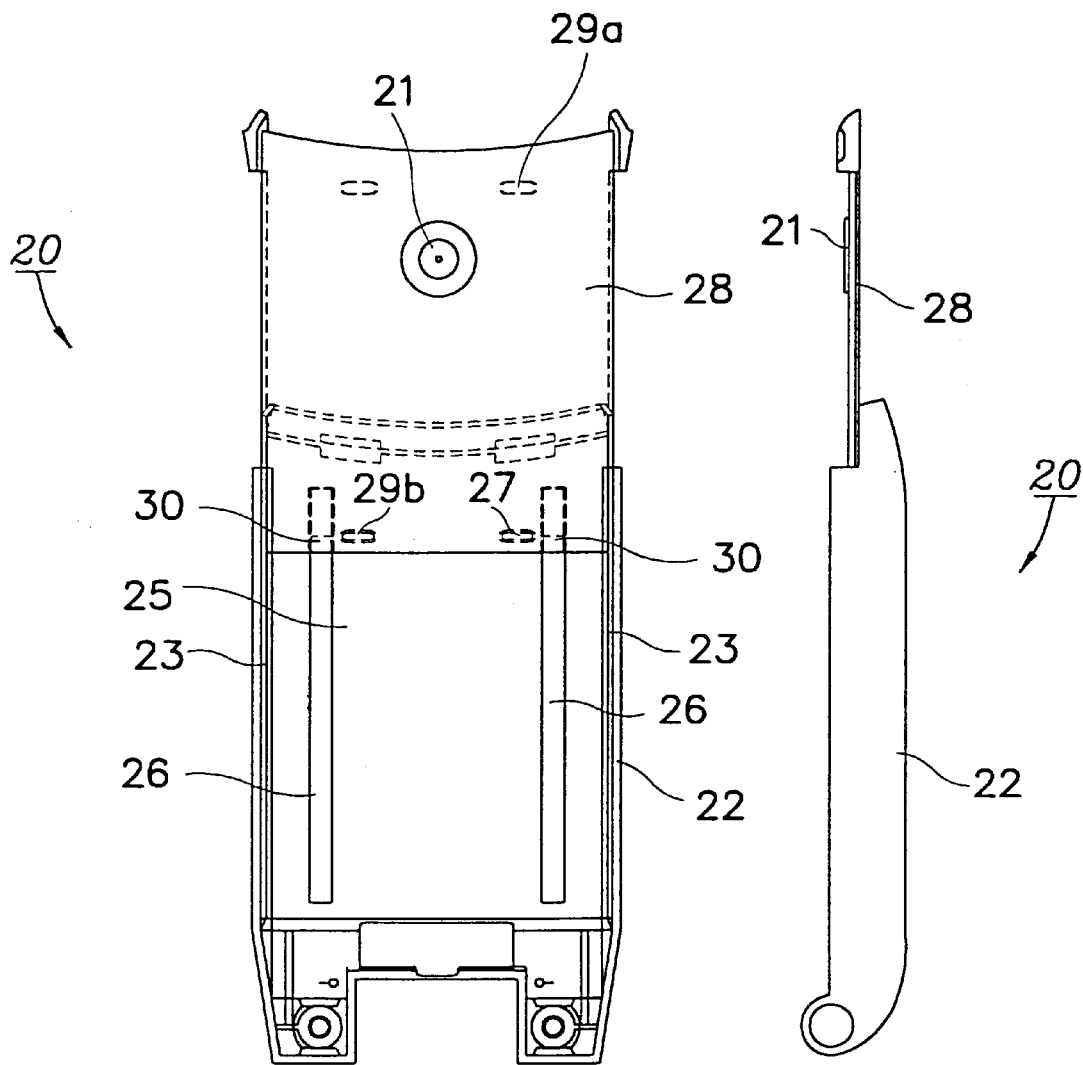
FIG. 5 is a schematic view of a flip cover of a flip type of portable telephone apparatus according to the first embodiment of the present invention.
Figure 6:
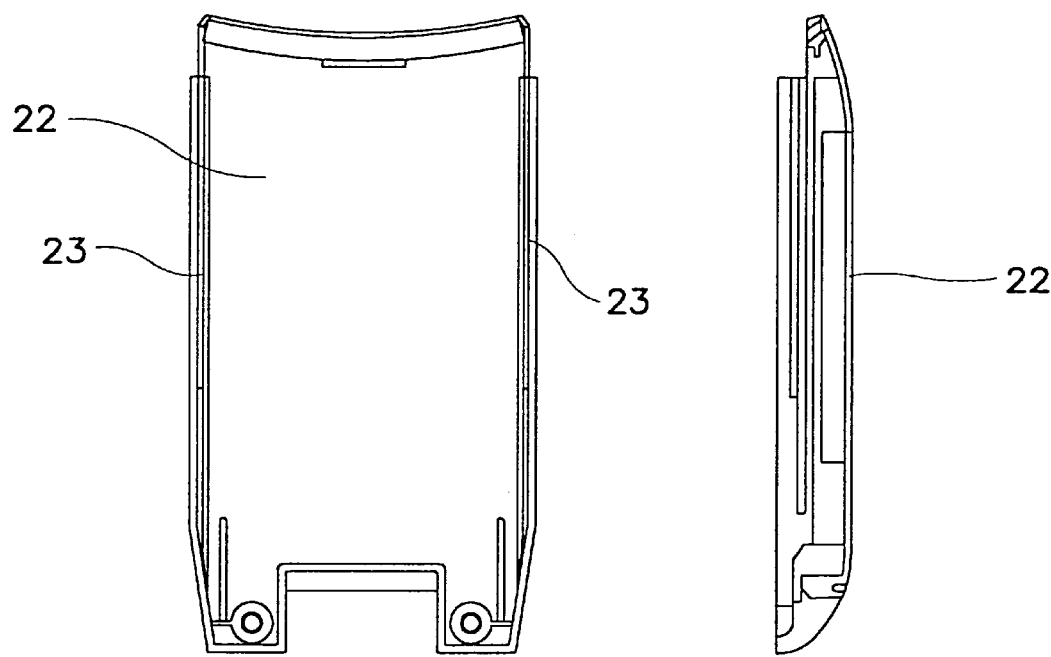
FIG. 6 is a schematic view illustrating an upper flip of a flip type of portable telephone apparatus according to the first embodiment of the present invention.
Figure 7:
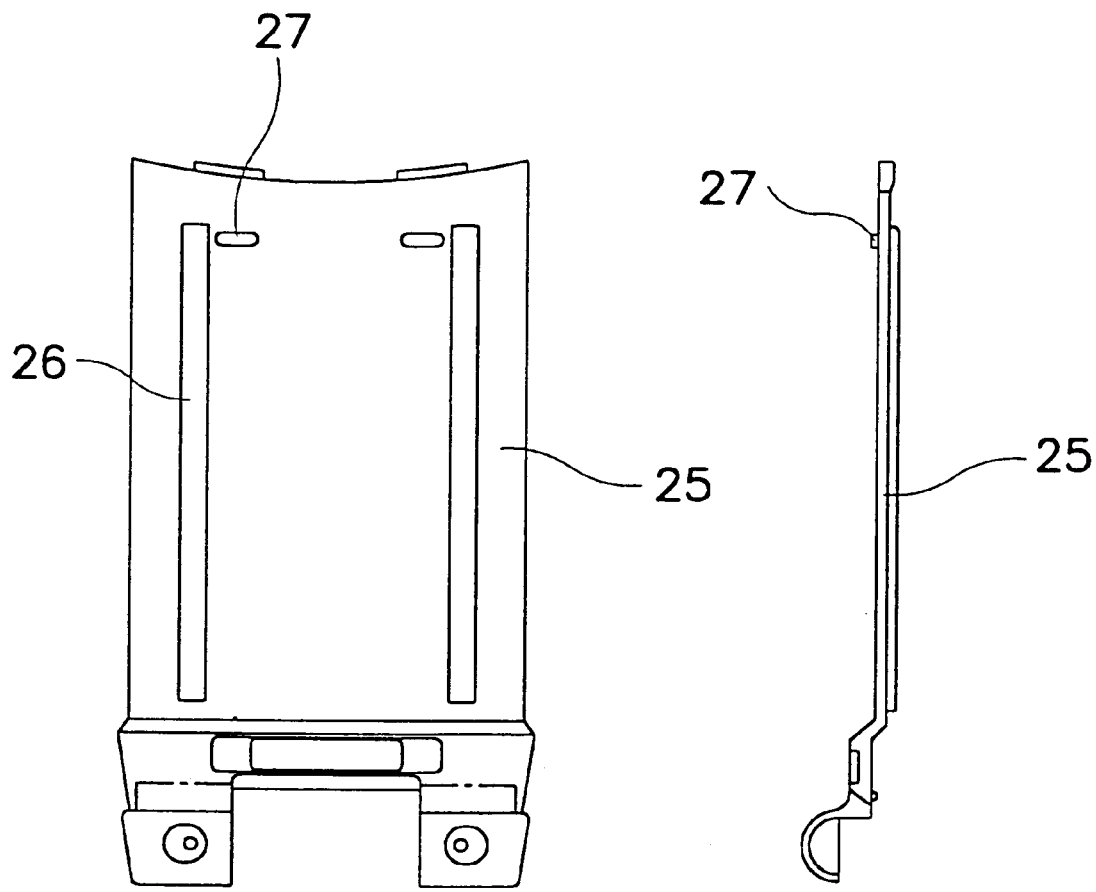
FIG. 7 is a schematic view illustrating a lower flip of a flip type of portable telephone apparatus according to the first embodiment of the present invention.
Figure 8:
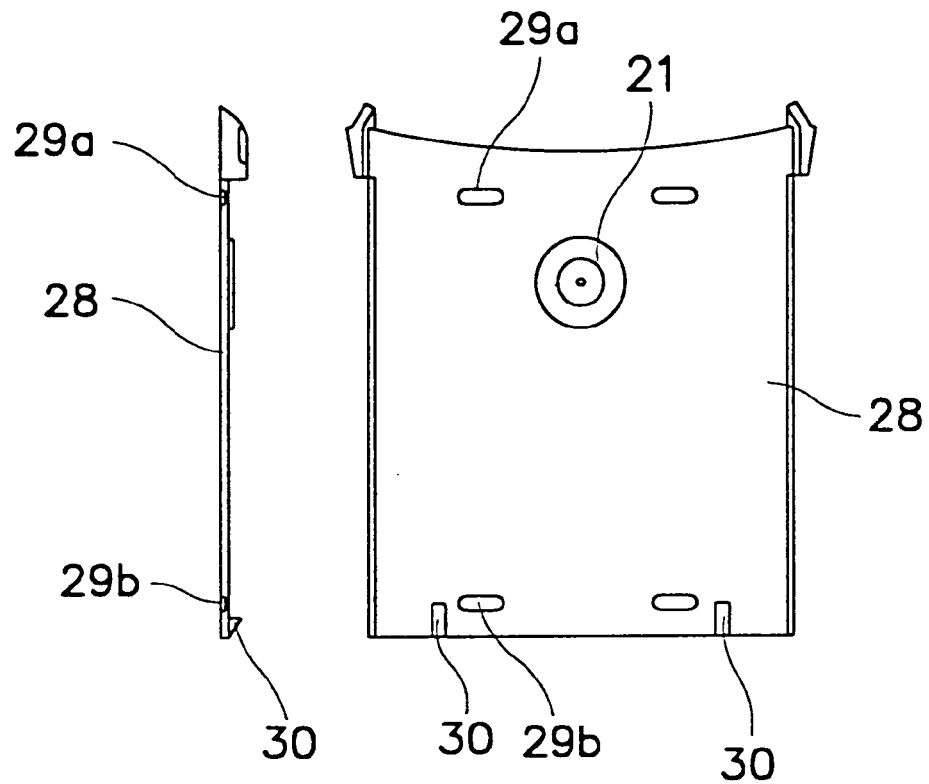
FIG. 8 is a schematic view illustrating an inner flip of a flip type of portable telephone apparatus according to the first embodiment of the present invention.

Referring to FIG. 4, in a flip type of portable telephone apparatus according to one embodiment of the present invention, a flip cover 20 is mounted and connected to a main body 10. The flip cover 20 is opened and closed by a switch. A speaker 11 and buttons are respectively mounted on upper and lower portions of the main body 10. A microphone 21 is mounted in the flip cover 20.

In the flip cover 20, flip modules are symmetrically mounted in a receiving portion of the main body 10 such that a connecting cap is externally exposed from the receiving portion. The connecting cap is mounted in the end of a hinged shaft having one end being elastically supported by a compression coil spring. Then, for assembly of the flip cover 20, a neck portion of the flip cover 20 is locked in the connecting cap.

The flip cover 20 as described above includes an upper flip 22, a lower flip 25, and an inner flip 28. The upper flip 22 and the lower flip 25 are combined with each other, as illustrated in FIGS. 4 to 8. The lower flip 25 is fixed in an inner side of the upper flip 22. The inner flip 28 is mounted to be slidably extended outward from the upper and lower flip through the combination of a guide rib 23 disposed along the sides of the upper flip 22 and a slide groove 26 disposed in the lower flip 25.

The guide ribs 23 are formed in the inner walls of the upper flip 22 at both sides. Slide grooves 26 are formed at both sides of lower flip 25, and fixing projections 27 are formed on an upper side thereof. The inner flip 28 which is slidably mounted in upper flip 22 by guide ribs 23, and the slide grooves 26 of lower flip 25, includes fixing grooves 29a and 29b at upper and lower ends thereof such that the fixing grooves 29a and 29b can be fixably fitted into fixing projection 27. The microphone 21 is mounted substantially at the center in the inside of the inner flip 28. Guide projections 30, formed at both sides of the front end of inner flip 28, fit into the slide grooves 26 of the lower flip 23 to facilitate a smooth sliding action.

The microphone 21 mounted in the inner flip 28 is connected to a flexible cable 40 through the lower flip 25 from the main body 10. In addition, a coupling telephone apparatus is formed in the inner flip 28 in which microphone 21 is mounted. Another coupling telephone apparatus is formed in the lower flip 25 which is connected to the main body 10 by the cable. These coupling telephone apparati are coupled to each other to operate the microphone 21.

Figure 9:
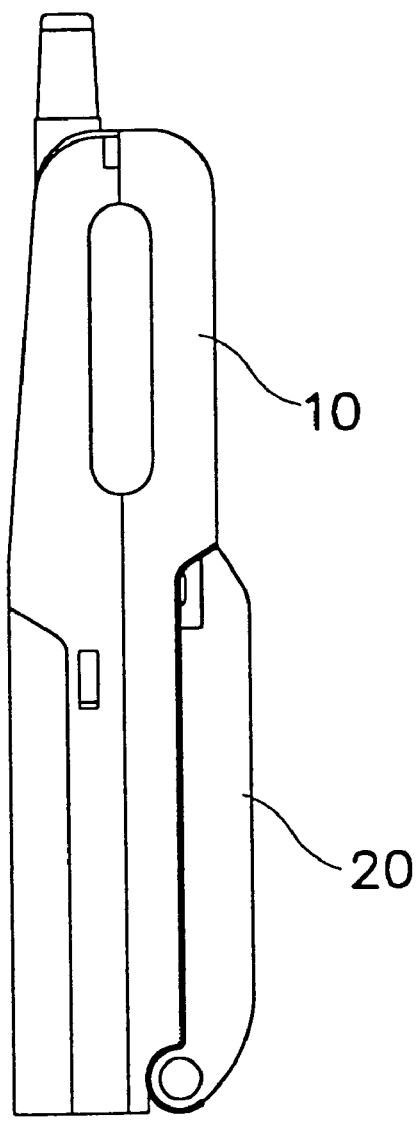
FIG. 9 is a side view of a portable telephone apparatus with the flip cover closed according to the first embodiment of the present invention.
Figure 10:
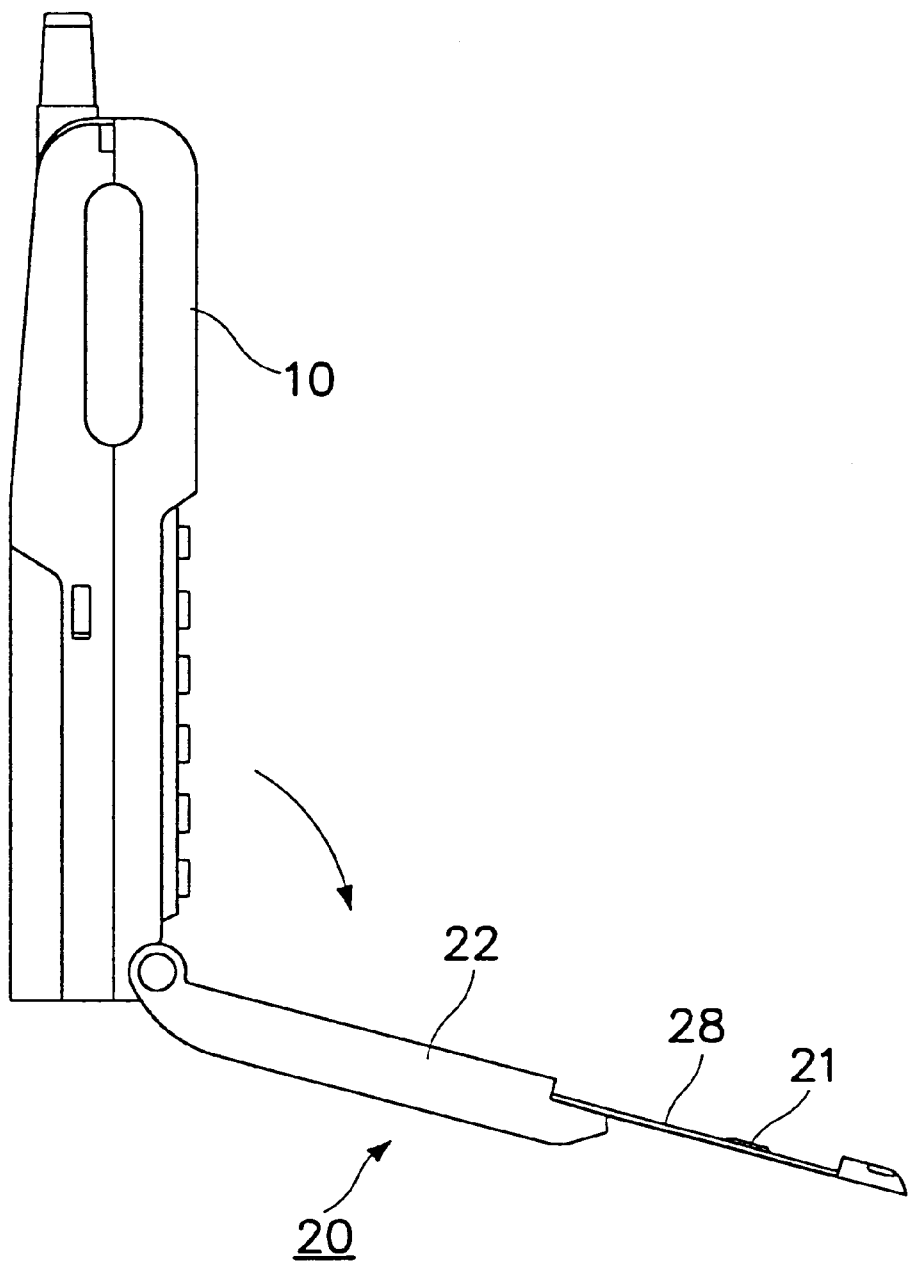
FIG. 10 is a side view of a portable telephone apparatus with the flip cover open according to the first embodiment of the present invention.
Figure 11:
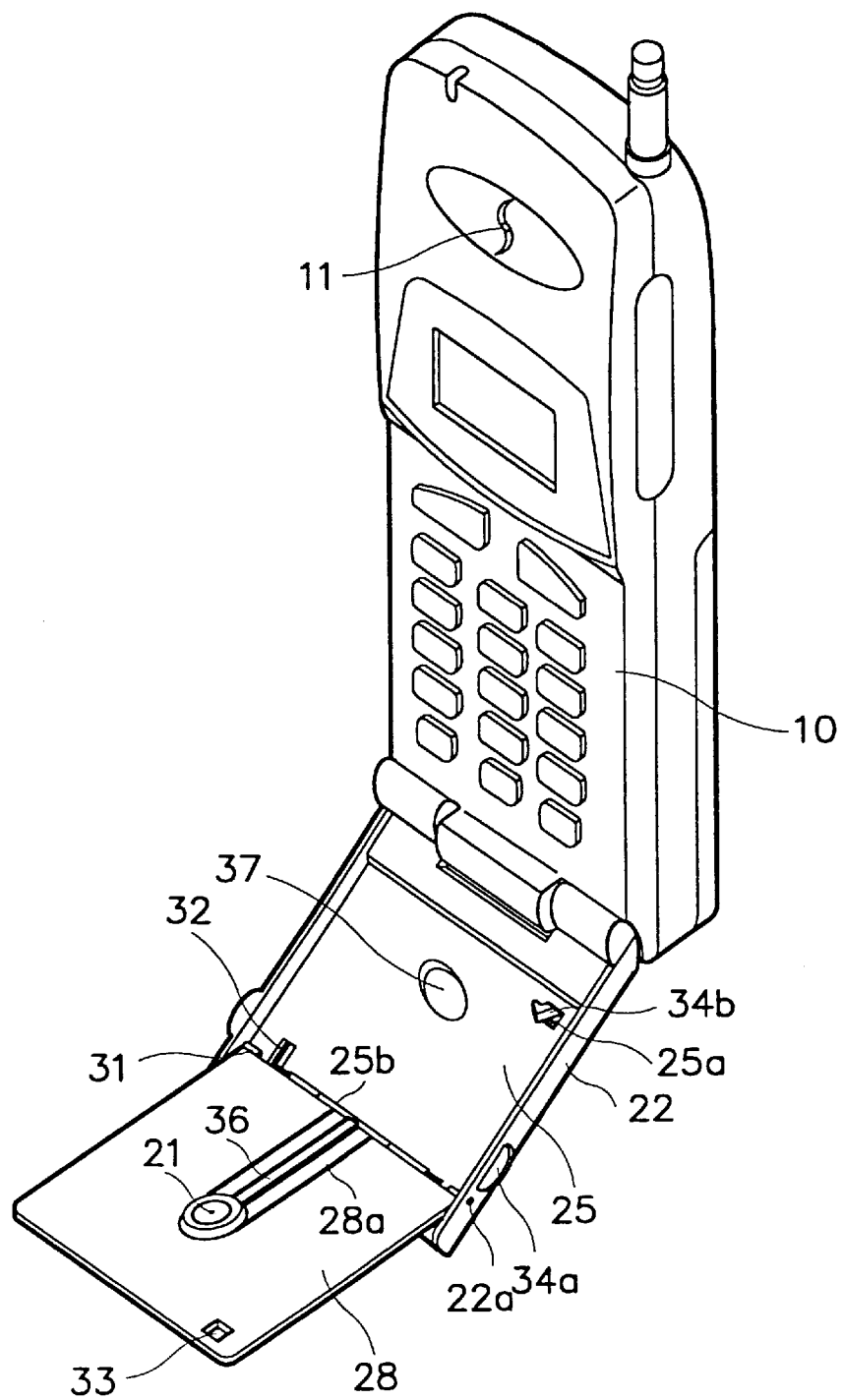
FIG. 11 is a perspective view of a flip type portable telephone apparatus according to a second embodiment of the present invention.
Figure 12:
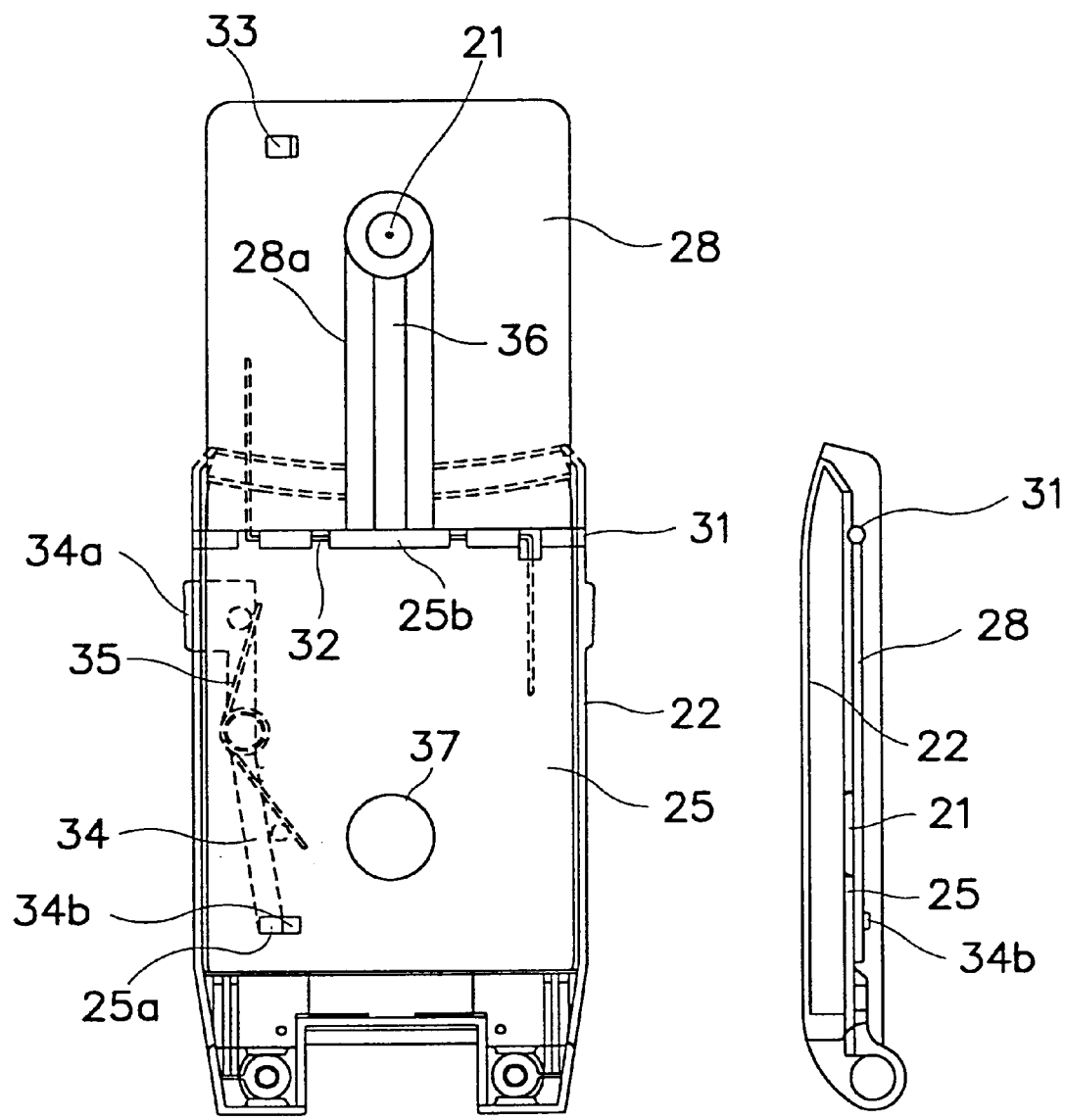
FIG. 12 is a schematic view of a flip cover of the flip type portable telephone apparatus according to a the second embodiment of the present invention.
Figure 13:
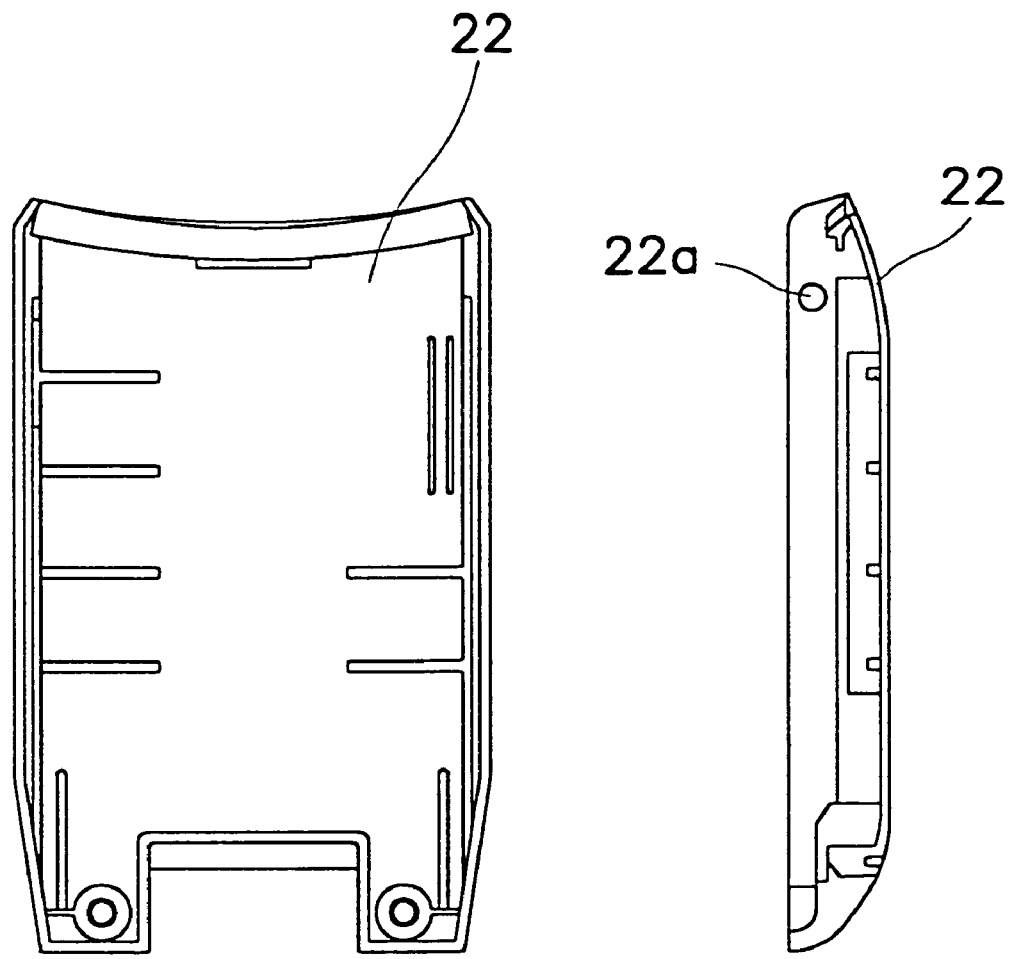
FIG. 13 is a schematic view of an upper flip of the flip type portable telephone apparatus according to the second embodiment of the present invention.
Figure 14:
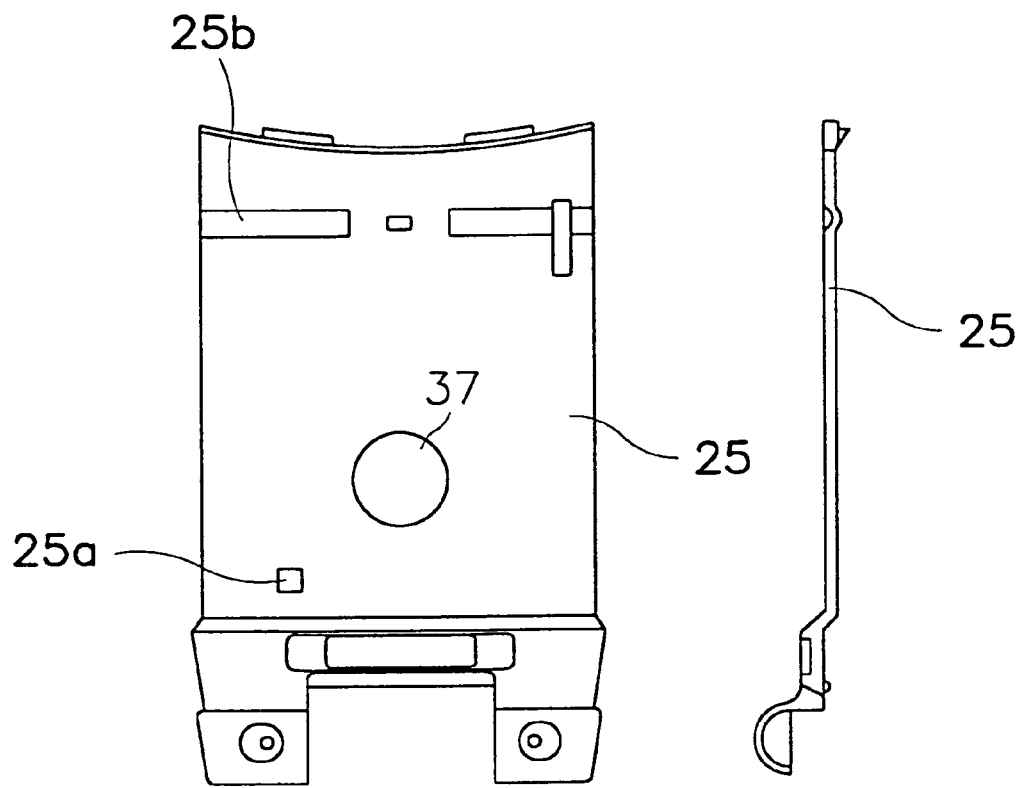
FIG. 14 is a schematic view of a lower flip of the flip type of portable telephone apparatus according to the second embodiment of the present invention.
Figure 15:
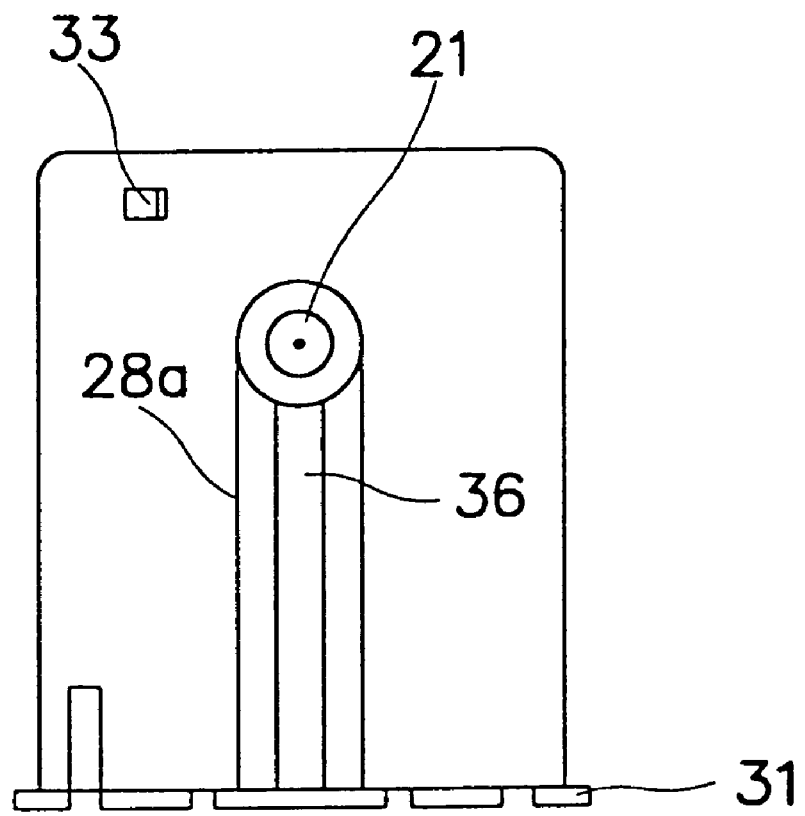
FIG. 15 is a schematic view of an inner flip of the flip type of portable telephone apparatus according to the second embodiment of the present invention.

When the flip cover 20 is mounted in the main body 10 as illustrated in FIG. 9, the user opens the flip cover 20 from the main body 10 when they intend to use the portable telephone and then slides inner flip 28 out as shown in FIG. 10. At this time, both sides of the inner flip 28 are guided by guide ribs 23 of the upper flip 22, and the guide projections 30 are guided into the slide grooves 26 of lower flip 25 such that inner flip 28 slidably extends from flip cover 22. When inner flip 28 has reached the extended operation state, lower fixing groove 29b of inner flip 28 is fixably fitted into the fixing projection 27 of lower flip 25 to maintain the extended state of inner flip 28.

As described above, when the user makes or receives calls when the flip cover 20 is extended a second stage, the inner flip 28, in which microphone 21 is mounted, prevents the user's voice transmission from being dispersed and any noise from occurring.

Upon completion of the portable telephone activity, the user pushes inner flip 28 into the upper flip 28. As a result of this action, lower fixing groove 29b is displaced from fixing projection 27 of lower flip 25. The guide projection 30 is moved into the inner side along slide grooves 26 such that inner flip 28 is inserted into upper flip 22. When inner flip 28 is completely inserted into upper flip 22, upper fixing groove 29a of inner flip 28 is fixably fitted into fixing projection 27 of the lower flip 25. The user then pivots the flip cover 20 toward the main body 10 such that it remains in a closed position as shown in FIG. 9.

In the flip type of portable telephone apparatus as described above, the flip cover combined with the main body by means of the switch is mounted to be extended at two stages. Thus, the dispersal of the user's speech transmitted voice signals can be prevented and any noise can be prevented from occurring when transmitting and receiving speech voice signals.

Another embodiment of the present invention will be described with reference to FIGS. 11 to 17. In the flip type of portable telephone apparatus according to a second embodiment of the present invention, flip cover 20 is mounted, and connected to a main body 10 and opened and closed by a switch. A speaker 11 and buttons are respectively mounted on upper and lower portions of the main body 10. A microphone 21 is mounted in the flip cover 20.

Flip cover 20 includes an upper flip 22, a lower flip 25, and an inner flip 28 as illustrated in FIGS. 11 to 15. The lower flip 25 is fixed in an inner side of upper flip 22. Inner flip 28 is combined with a hinged groove 22a of the upper flip 22 and mounted to be foldingly extended from upper flip 22.

The hinged groove 22a is formed at both sides of the upper side of upper flip 22. In the upper side of lower flip 25, a hinge portion 25b is formed to be combined with a hinge of the inner flip 28. The hinge portion 25b and the inner flip 28 hinge are connected with each other by means of a torsion spring 32. One end of the torsion spring 32 is fixed to the inner flip 28 and the other end thereof is fixed to the lower flip 25.

A hinge pin 31 is formed at both sides of the hinge portion of the inner flip 28 to be fitted into the hinge groove 22a which is formed at both sides of upper flip 22 so that inner flip 28 rotates or pivots about hinge pins 31. A locking hole 33 is formed on a lower side of inner flip 28. A lock mechanism includes a lock arm 34 mounted at one side between the upper flip 22 and the lower flip 25 to lock the inner flip 28 in a closed position. A torsion spring 35 is mounted on the center shaft of the lock arm 34 such that a push portion 34a, at one side of lock arm 34, projects out from flip 22. Lock arm 34 has a lug 34b at its other side. Lug 34b projects through a hole 25a of the lower flip 25. Locking hole 33 of inner flip 28 is fitted into the lug 34b such that inner flip 28 is locked.

If the push portion 34a of lock arm 34 is pushed, the inner flip 28 turns from the upper flip 22 by the elastic force of the torsion spring 32 which is mounted in the hinge portion and is then open with two stages. The inner flip 28 has a groove 28a at the center thereof to mount a microphone 21 and a cable. A cover 36 is assembled to mount the microphone 21 in the groove 28a and protect the same. The cable of the microphone 21 is connected to the main body 10 through the hinge portion.

When the user intends to use the telephone, the user opens the flip cover from the main body 10 and then pushes the push portion 34a of lock arm 34 which is mounted in the upper flip 22. The lug 34b of the locker 34 is released from the locking hole 33 such that inner flip 28 pivots outward by means of the elastic force of torsion spring 32 about the hinge pins 31 at both sides thereof, and is extended a second stage from upper flip 22.

If a user places and receives calls when flip cover 20 is extended in two stages as shown in FIG. 17b, inner flip 28 prevents the transmission of the user's speech in voice signals from being dispersed, and prevents any noise from occurring when transmitting and receiving voice signals.

Figure 16:
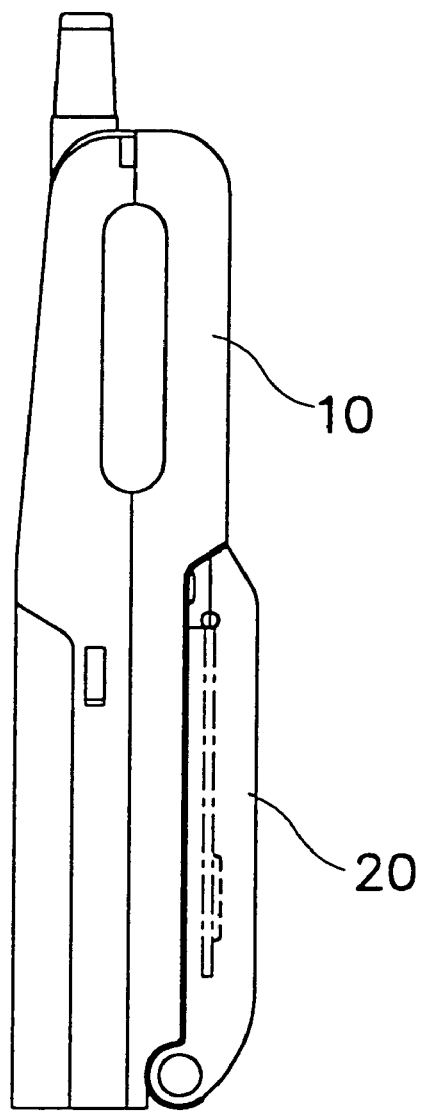
FIG. 16 is a side view of the portable telephone apparatus with the flip cover closed according to the second embodiment of the present invention.

Under the above state, the user rotates (i.e., "flips") the inner flip 28 towards the inside of the upper flip 22 after the completion of a call such that locking hole 33 is fitted into lug 34b of lock arm 34. A groove 37, formed in lower flip 25 is adapted to receive a portion of microphone 21 that projects from its mounted position. Thereafter, the user rotates the flip cover 20 toward main body 10 such that flip cover 20 is closed as shown in FIG. 16.

In the flip type of portable telephone apparatus according to another embodiment of the present invention, the flip cover, combined with the main body by means of the switch, is mounted to be extended at two stages, and the microphone is mounted in the inner flip within a predetermined distance between the speech transmitting portion and the speech receiving portion. This confirmation prevents the transmission of the user's speech from being dispersed and prevents any noise from occurring when transmitting and receiving voice signals.

The aforementioned portable telephone apparatus of the present invention has advantages in that the dispersal of transmitted speech or voice can be prevented and any noise can be prevented from occurring when transmitting and receiving speech or voice when the flip cover combined with the main body is mounted to be extended in two stages.

Although the present invention has been described in detail hereinabove, it should be clearly understood that many variations and/or modifications of the basic inventive concepts herein taught which may appear to those skilled in the art will still fall within the spirit and scope of the present invention as defined in the appended claims.

What is claimed is:

1. A flip cover in a flip type portable telephone apparatus, combined with a main body of the portable telephone apparatus, the flip cover comprising:

an upper flip having an inner wall with at least one guide rib formed therein;

a lower flip fixed to an inner side of the upper flip and having an upper side and at least one slide groove formed in said upper side;

an inner flip combined with and being slidably arranged with said at least one guide rib and said at least one slide groove for slidably extending from said upper and lower flip;

a fixing projection provided on an upper side of said lower flip;

at least one fixing groove disposed in said inner flip for being fixably fitted into the fixing projection; and at least one guide projection formed at a front end of the inner flip and adapted to be fitted into said at least one slide groove.

2. The flip cover as claimed in claim 1, wherein said at least one fixing groove of said inner flip is selectively fitted into said fixing projection to maintain said inner flip in an extended position.

3. The flip cover as claimed in claim 1, wherein a microphone is mounted in the inner flip such that a predetermined distance between said microphone and a speaker receiving portion is maintained.

4. The flip cover as claimed in claim 3, wherein said microphone is connected to the main body via a flexible cable through said lower flip.

5. A flip cover in a flip type portable telephone apparatus, combined with a main body, the flip cover comprising:

an upper flip having a hinge groove formed on opposing sides thereof;

a lower flip fixed to an inner side of said upper flip and having a hinge portion formed in an upper side;

an inner flip being mounted on the lower flip and having a hinge portion combined with said hinge groove and said lower flip hinge portion for rotating about said hinge portion;

a spring for connecting the lower flip hinge portion with the inner flip hinge portion;

a hinge pin formed at opposing sides of the inner flip hinge portion to be slidably fitted into said hinge groove;

a lock arm positioned between said lower flip and said upper flip; and a torsion spring being positioned at a center shaft of the lock arm to dispose one end of said lock arm in one end of said upper flip, wherein said lock arm is positioned to enable an opposite end thereof to engage and lock said inner flip and to open said inner flip from said upper flip by releasing the locking engagement of the inner flip when one end of said lock arm is pushed.

6. The flip cover as claimed in claim 5, wherein said spring connecting the hinge portion of the lower flip and the hinge of the inner flip is a torsion spring of which one end is fixed to the inner flip and the other end is fixed to the lower flip.

7. The flip cover as claimed in claim 1, further comprising:

a groove disposed in said lower flip;

said lock arm having a push portion at one end projecting from said upper flip and a lug formed in its other end, said lug projecting through said groove; and a locking hole disposed in said inner flip and adapted to receive said lug to lock said inner flip in a closed position.

8. The flip cover as claimed in claim 5, wherein said inner flip further comprises a centralized groove adapted to mount a microphone and a cable therein and a cover to protect the microphone, such that a predetermined distance between a speech transmitting portion and a speech receiving portion can be ensured.

9. The flip cover as claimed in claim 8, wherein the cable of the microphone which is mounted in the inner flip is connected to the main body by passing through the upper flip and the lower flip through the hinge portion of the lower flip.

10. A flip cover having a microphone mounted therewith for a flip type of telephone apparatus comprising:

an upper flip having slide means; a lower flip fixed to an inner side of said upper flip and having slide means formed in an upper side thereof;

an inner flip slidably mounted in said upper flip slide means and said lower flip slide means; and retaining means for retaining said inner flip in extended and closed positions.

11. The flip cover as claimed in claim 10, wherein said upper flip slide means comprises at least one guide rib formed therein.

12. The flip cover as claimed in claim 10, wherein said lower flip slide means comprises at least one slide groove formed in an upper side thereof.

13. The flip cover as claimed in claim 10, wherein said inner flip further comprises at least one guide rib and at least one slide groove for slidably engaging said upper flip and lower flip slide means.

14. The flip cover as claimed in claim 10, wherein said retaining means comprises:

a fixing projection provided on an upper side of said lower flip; and at least two fixing grooves disposed in said flip for independently engaging said fixing projection.

15. A flip cover having a microphone mounted therewith for a flip type of telephone apparatus comprising:

an upper flip having hinge means; a lower flip fixed to an inner side of said upper flip and having hinge means formed in an upper side thereof;

an inner flip having hinge means coupled to said upper and lower flip hinge means for enabling said inner flip to be rotatably extended from upper and lower flip;

spring means for connecting said lower flip hinge means with said inner flip hinge means; and locking means disposed between said upper and lower flip for retaining said inner flip in a closed position when the telephone apparatus is not in use.

16. The flip cover as claimed in claim 15, wherein said upper flip hinge means comprises a hinge groove formed on opposing sides thereof.

17. The flip cover as claimed in claim 15, wherein said lower flip hinge means comprises a hinge pin formed on opposing sides thereof, each of said hinge pins engaging said hinge groove in said upper flip.

18. The flip cover as claimed in claim 15, wherein said locking means comprises:

a lock arm having a push portion at one end projecting from said upper flip and a lug formed on its other end;

a groove disposed in said lower flip, said lug extending through said groove; and a locking hole disposed in said inner flip in a closed position.

* * * * *